US012506294B2

(12) United States Patent
Andert

(10) Patent No.: US 12,506,294 B2
(45) Date of Patent: Dec. 23, 2025

(54) PLUG CONNECTOR, DEVICE, AND METHOD FOR PRODUCING A SECONDARY LOCK FOR A PLUG CONNECTOR

(71) Applicant: MD ELEKTRONIK GmbH, Waldkraiburg (DE)

(72) Inventor: Alexander Andert, Waldkraiburg (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 413 days.

(21) Appl. No.: 18/187,273

(22) Filed: Mar. 21, 2023

(65) Prior Publication Data

US 2023/0327365 A1 Oct. 12, 2023

(30) Foreign Application Priority Data

Apr. 6, 2022 (DE) ..................... 10 2022 108 296.2

(51) Int. Cl.
*H01R 13/52* (2006.01)
*H01R 13/62* (2006.01)
*H01R 43/00* (2006.01)

(52) U.S. Cl.
CPC ..... *H01R 13/5202* (2013.01); *H01R 13/5205* (2013.01); *H01R 13/62* (2013.01); *H01R 43/005* (2013.01)

(58) Field of Classification Search
CPC ............ H01R 13/5202; H01R 13/5205; H01R 13/62; H01R 43/005
USPC .......................................................... 439/282
See application file for complete search history.

(56) References Cited

U.S. PATENT DOCUMENTS

| | | | | |
|---|---|---|---|---|
| 2014/0073163 | A1 | 3/2014 | Kojima et al. | |
| 2019/0140389 | A1* | 5/2019 | Yi | H01R 13/5205 |
| 2020/0106210 | A1* | 4/2020 | Kang | H01R 43/005 |
| 2021/0184440 | A1 | 6/2021 | Kilian et al. | |
| 2022/0077626 | A1* | 3/2022 | Sato | H01R 13/5205 |

FOREIGN PATENT DOCUMENTS

| | | | |
|---|---|---|---|
| DE | 102007055181 | A1 | 5/2009 |
| DE | 102012203222 | A1 | 9/2013 |
| EP | 2999057 | A1 | 3/2016 |
| JP | H 0638171 | A | 2/1994 |
| JP | H 09147965 | A | 6/1997 |
| WO | WO 2010100974 | A1 | 9/2010 |
| WO | WO 2012120834 | A1 | 9/2012 |

* cited by examiner

*Primary Examiner* — Tulsidas C Patel
*Assistant Examiner* — Jeffrey Mountain
(74) *Attorney, Agent, or Firm* — LEYDIG, VOIT & MAYER, LTD.

(57) ABSTRACT

A plug connector for a cable includes a housing having at least one opening and at least one cavity, wherein the cable is insertable into the at least one cavity through the at least one opening. At least one undercut is formed on a circumference of the at least one cavity. A secondary lock is releasably engageable with at least one the undercut. The cable is fastenable in the housing by the secondary lock. The secondary lock comprises a main body which is formed in one piece with a seal such that the housing is sealable by the secondary lock in a watertight manner.

15 Claims, 7 Drawing Sheets

PLUG CONNECTOR, DEVICE, AND METHOD FOR PRODUCING A SECONDARY LOCK FOR A PLUG CONNECTOR

CROSS REFERENCE TO RELATED APPLICATIONS

This application claims benefit to German Patent Application No. DE 10 2022 108 296.2, filed on Apr. 6, 2022, which is hereby incorporated by reference herein

FIELD

The invention relates to a plug connector, to a device, and to a method for producing a secondary lock for a plug connector, in particular for a watertight plug connector.

BACKGROUND

Cables are used for relaying electrical and/or optical signals. To connect two cables together, or to connect a cable to another component, plug connectors are used. In cable manufacture, at least one plug connector is fastened to an end of a cable. In some fields, such as the automotive field, there are special requirements in terms of the reliability during cable manufacture and the subsequent connecting. One requirement is the secureness of the connection, for example by way of a so-called secondary lock. Another requirement may involve the watertightness of the plug connector.

To make a plug connector watertight, in the prior art a plurality of components are assembled, with each component having its own function, and a watertight plug connector is obtained overall. In this case, the watertightness is generally established by a separate sealing element.

The plug connectors in the prior art have at least the drawback that a relatively large number of components are needed for one plug connector. This relatively large number comes with higher procurement costs and a greater number of fitting operations and processes. The higher costs make the product more expensive to produce, and the multiple process steps mean the product takes longer to finish. In some plug connectors in the prior art, another drawback is that they are difficult to take apart, or cannot be taken apart at all, and/or have considerable structural differences between a watertight and a non-watertight variant. However, the ability to be taken apart is essential in the automotive field, and adaptable systems without any significant structural differences are generally preferred.

SUMMARY

In an embodiment, the present invention provides a plug connector for a cable. The plug connector includes a housing having at least one opening and at least one cavity, wherein the cable is insertable into the at least one cavity through the at least one opening. At least one undercut is formed on a circumference of the at least one cavity. A secondary lock is releasably engageable with at least one the undercut. The cable is fastenable in the housing by the secondary lock. The secondary lock comprises a main body which is formed in one piece with a seal such that the housing is sealable by the secondary lock in a watertight manner.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
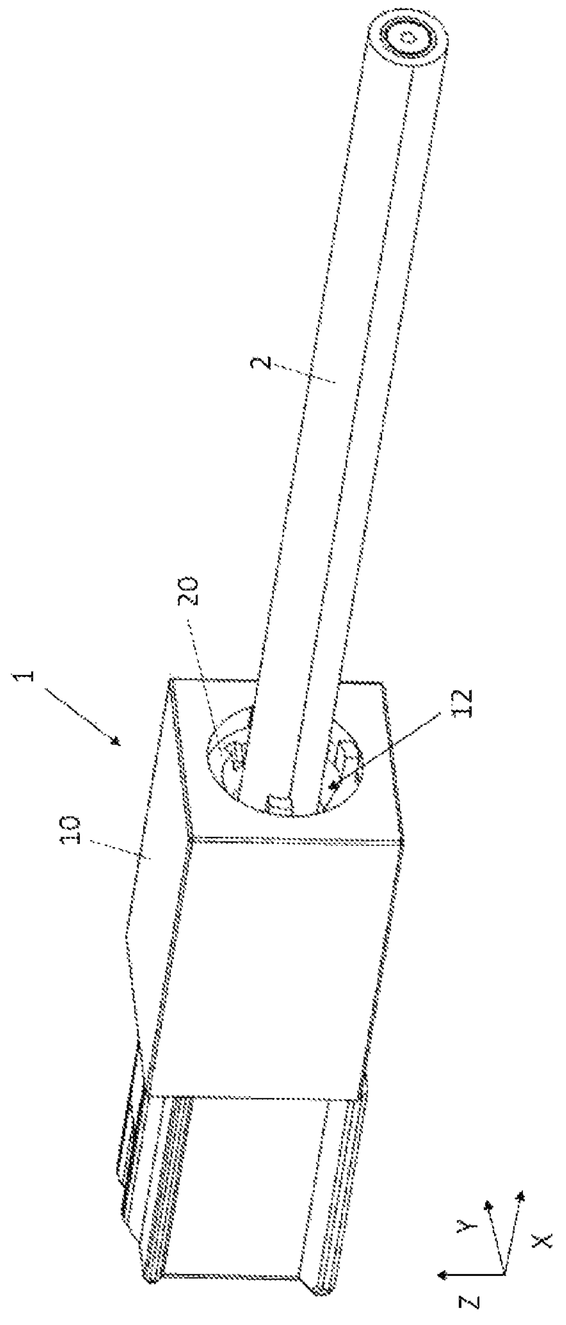
FIG. 1 is a perspective view of an embodiment of a plug connector in the fitted state.

Embodiments of the present invention provide a plug connector, a device, and a production method in which the plug connector can be watertight and have a lower number of components.

In particular, an embodiment of the present invention provides a plug connector for a cable that can be watertight and has a lower number of components, the plug connector comprising a housing having at least one opening and one cavity, wherein the cable can be inserted into the cavity through the opening, at least one undercut formed on the circumference of the cavity, and a secondary lock that can be releasably engaged with the undercut, wherein the cable can be fastened in the housing by the secondary lock, and wherein the secondary lock comprises a main body which is formed in one piece with a seal such that the secondary lock can seal the housing in a watertight manner.

In the case of the present plug connector, the secondary lock fixes the cable in position in the housing when the plug connector is in the assembled state. The fixing is achieved first by a frictional fit on the cable and second by interlocking at the insert or crimp barrel fastened to the cable. The cable is thus secured multiple times in the housing. In addition, the present plug connector can be released again after being fitted. To release the plug connector, the secondary lock is compressed substantially along its circumference and pulled out of the housing. The present plug connector can be used as a watertight variant or as a non-watertight variant. The main body of the secondary lock is substantially the same in both variants. In the non-watertight variant, substantially only the seal on the secondary lock may be omitted when producing the secondary lock. As a result, the present plug connector can be flexibly used. In the watertight variant, the secondary lock achieves both the fixing function and the watertightness function due to the main body of the secondary lock being constructed in one piece with the seal. A separate seal, like in the prior art, is unnecessary. Owing to the lower number of components, the plug connector is quicker and simpler to fit.

Preferably, the seal has at least one external sealing lip that protrudes radially outward from the seal in order to obtain watertight sealing between the secondary lock and the housing, and/or the seal has at least one internal sealing lip that protrudes radially inward from the seal in order to obtain watertight sealing between the secondary lock and the cable.

The at least one external sealing lip preferably comprises a plurality of external sealing lips. A plurality of external sealing lips increases the reliability of the seal. In particular, the at least one external sealing lip is made of a resilient material. Owing to the resilient material, the at least one external sealing lip is flexible. In addition, the outer radius of the external sealing lip is preferably larger than the radius of the opening in the housing or the radius of the cavity in the housing. As a result, the external sealing lip presses against the wall of the opening or cavity during fitting and forms a watertight seal with respect to the exterior. The same applies to the at least one internal sealing lip, which seals the opening or cavity with respect to the cable. However, the locking of the secondary lock in the undercut and the fixing of the cable in position in the housing are separate from the external and/or internal sealing lips, so the function of the secondary lock is not impaired by the function of the seal.

Preferably, the main body of the secondary lock has a slot in a longitudinal direction, and the seal fills the slot. Owing to the slot, the secondary lock can be clenched or compressed in the circumferential direction. The circumference of the main body can thus be elastically altered or reduced even if the material is relatively stiff. The reduction in the circumference of the secondary lock is used, for example, when releasing the secondary lock from the housing. Since the seal fills the slot, the at least one external and/or internal sealing lip can run around the full circumference of the secondary lock and can seal the opening or cavity around its full circumference.

Preferably, the main body is made of a harder material than the seal such that the secondary lock is stable and elastically deformable. The harder material of the main body gives the secondary lock stability. Owing to the stability, the secondary lock withstands unwanted (tensile) forces and securely fixes the cable in position in the housing. Since the seal is made of a softer material than the main body, the secondary lock can also be compressed in the circumferential direction and has the resilient properties required for inserting the secondary lock into the housing and releasing it again.

In particular, an embodiment of the present invention provides a method for producing a secondary lock for a plug connector that can be watertight and has a lower number of components, wherein the method comprises the following steps: using a two-component method, and forming a main body of the secondary lock out of a first material, and then forming a seal out of a second material on the main body of the secondary lock. The two-component method makes it possible to form a single-piece component out of two components. In particular, in the two-component method two different plastics materials are combined to form one component. Forming the main body and then forming the seal on the main body is advantageous in that even just the main body can be formed in order, for example, to produce a non-watertight variant of the plug connector. On the other hand, a seal might be attached to a ready-produced main body at a later time. The production process of the secondary lock is thus very flexible.

Preferably, the two-component method comprises an injection molding method, and the first material is harder than the second material. Injection molding methods allow plastics components to be reliably produced, in particular in terms of the durability of the produced plastics components. Since the first material is harder, it gives the component a basic structure such that the second material can be attached to the main body reliably, in particular without generating any unwanted deformations on the main body.

Preferably, in the step of forming the main body of the secondary lock, at least one cut-out, in particular a slot, is made along a longitudinal axis of the main body. In the prior art, sealing elements are predominantly built around the entire circumference, i.e., the hard component is produced as a whole (without any discontinuity) and the seal, as a separate component, is also built as a whole the whole way around. As a result, the hard component is not movable or flexible. By forming a cut-out, in particular a slot, along the longitudinal axis, the main body or secondary lock becomes flexible. The present method thus comprises method steps that are different from the prior art, as a result of which the produced component has a different action from that in the prior art.

Preferably, in the step of forming the main body of the secondary lock, recesses, in particular grooves, are formed in the main body such that the main body can be centered using the recesses when forming the seal. To attach the seal to the main body, a position change has to be made on the mold. There are numerous possibilities in this respect, for example turning the entire mold or moving an index plate (a part of the mold) from a first position into at least one other position. In the process, the grooves help to fix the main body in position during a position change. The recesses or grooves do not have any impact on the watertightness of the plug connector.

Preferably, in the step of forming the main body of the secondary lock, holes are made in the main body, and these holes are filled with the second material when forming the seal. The holes are used for venting the cavities during a filling operation so that no air is enclosed by the melt and no bubbles or voids form in the component. In addition, the holes help to better connect the main body to the seal. This is advantageous since strong forces may act on the seal when the finished secondary lock is pushed on the cable or into the housing.

In particular, an embodiment of the present invention provides a device for the method for producing a secondary lock for a plug connector that can be watertight and has a lower number of components, the device comprising a mold for producing injection-molded parts having at least one geometric difference, wherein a first geometry on the mold has an outline for the main body of the secondary lock, and a second geometry on the mold has an outline for the main body together with the seal. The mold is special in that it has a geometric difference, meaning that it comprises a first geometry (cavity) that has the outline of the main body (pre-molding), and comprises a second geometry that comprises the outline of the main body together with the outline of the seal. As a result, only one mold is required for the entire production method. This saves on space, costs, and time during production.

Embodiment examples will be described in detail below with reference to the drawings.

FIG. 1 shows an embodiment example of a plug connector 1 on a cable 2. During cable manufacture, the plug connector 1 is rigidly connected to an end of the cable 2. In particular, the connection is secure, watertight, and can be taken apart again for recycling.

Figure 2:
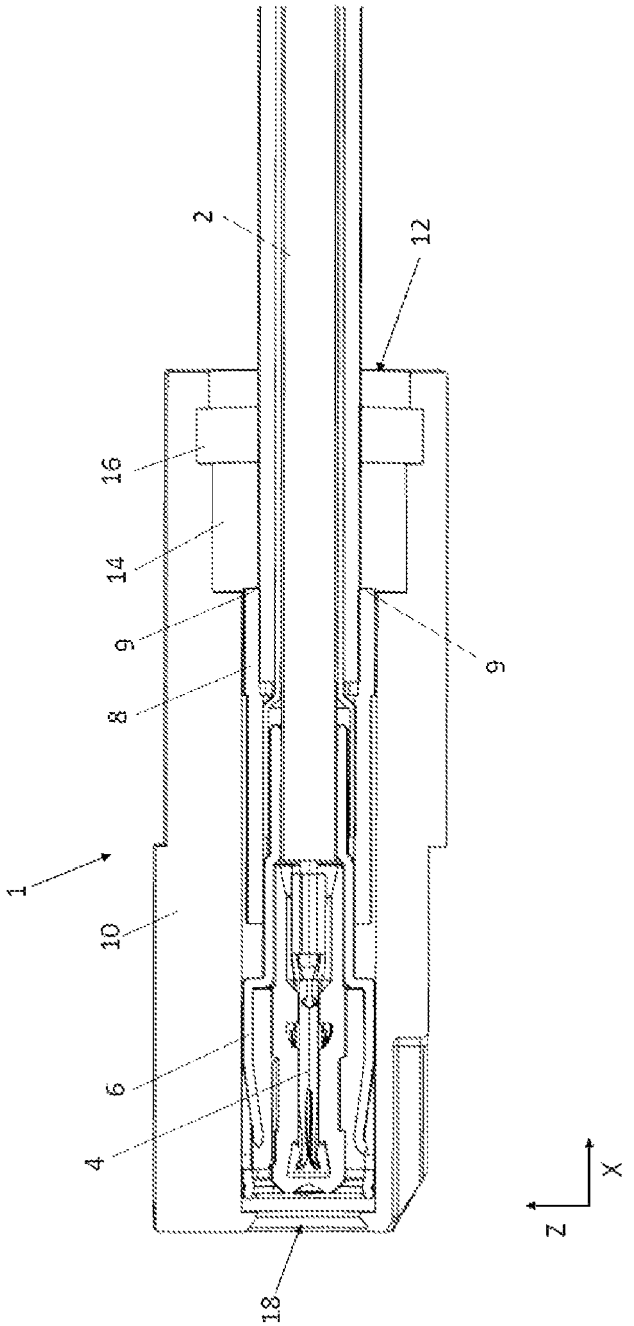
FIG. 2 is a cross-sectional view of FIG. 1 from the side without an inserted secondary lock.

The plug connector 1 shown has a housing 10 having an opening 12 and a cavity 14. The opening 12 forms an access to the cavity 14 such that the cable 2 can be inserted into the cavity 14 through the opening 12. The cavity 14 has at least one undercut 16 on its (inner) circumference (see FIG. 2). The undercut 16 may be formed all around or just in one or more circumferential portions. The depth of the undercut 16 is predetermined according to the secondary lock 20 used.

Figure 3:
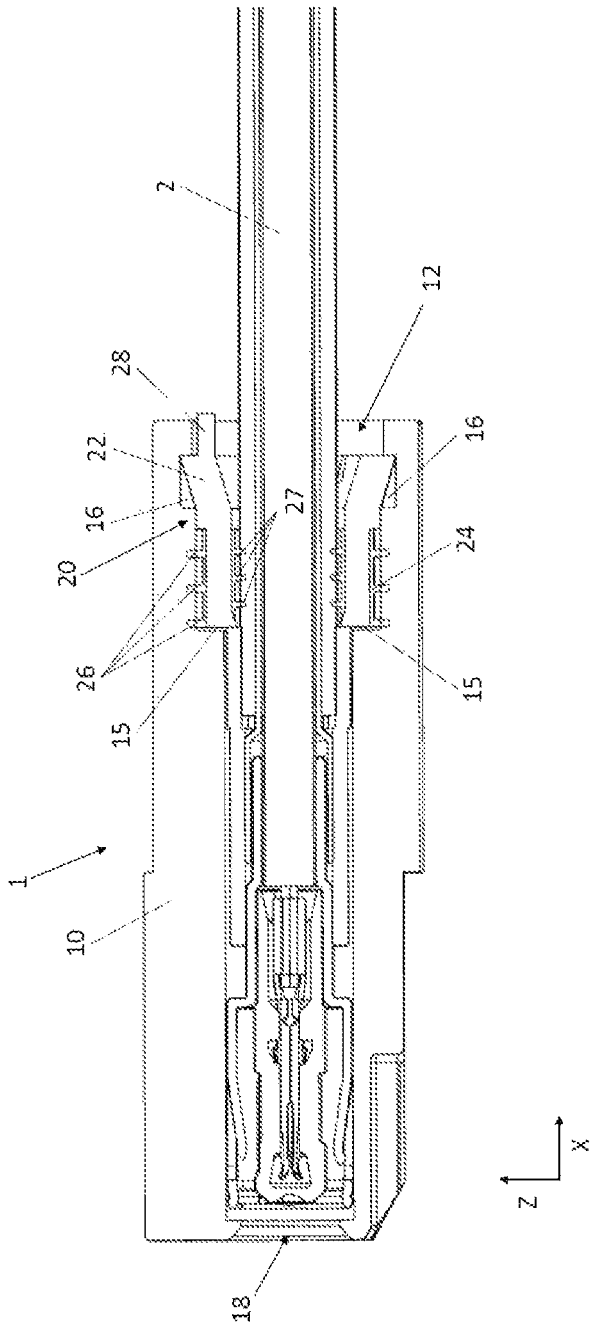
FIG. 3 is a cross-sectional view of FIG. 1 from the side with an inserted secondary lock.

The illustrated embodiment of the plug connector 1 also has a secondary lock 20. During assembly, the secondary lock 20 can be releasably engaged with the undercut 16. In the assembled state, the secondary lock 20 is securely fixed to the undercut 16. The engagement can also be released again. However, the releasing must be intentional and preferably be carried out using a tool. To release the engagement, the projections 28 (see FIG. 4) are usually moved toward one another such that the outer diameter of the secondary lock 20 is reduced to such an extent that the secondary lock 20 can be removed from the undercut 16 and out of the housing 10 through the opening 12. In addition, the cable 2 can be fastened in the housing 10 by means of the secondary lock 20 (see FIG. 3). To fasten the cable 2, in the assembled state the secondary lock 20 exerts a compressive or clamping force on the cable 2 in the radial direction such that the cable 2 is held in the housing 10 by means of a frictional fit. In addition, the secondary lock 20 prevents the insert or crimp barrel 8 fastened to the cable 2 from moving, thereby fixing the cable 2 in position in the housing 10 by means of interlocking.

The cable 2 shown is a coaxial cable that comprises at least one inner-conductor contact 4 and one outer-conductor contact 6 for contacting a complementary connector. The inner- and outer-conductor contacts 4, 6 are fastened to the cable 2 using the crimp barrel 8. In the assembled state, a crimp barrel stop 9 abuts the secondary lock 20 (see FIG. 3) such that the cable 2 is interlockingly held in the housing 10 together with the insert (inner- and outer-conductor contact 4, 6 together with the crimp barrel 8). A connection between the inner- and outer-conductor contact 4, 6 of the cable 2 and a complementary connector can be established via a contact opening 18, which is preferably opposite the opening 12.

Figure 4:
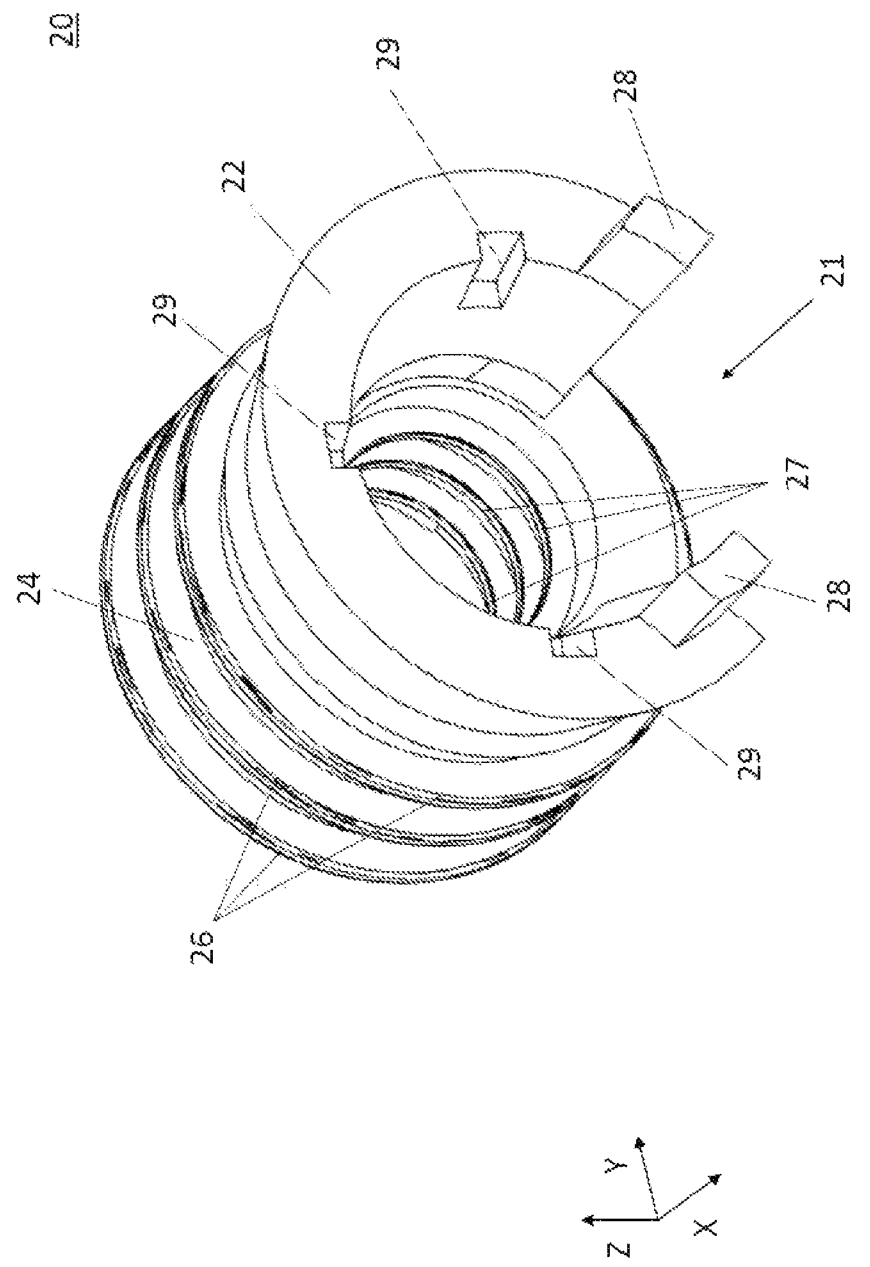
FIG. 4 is a perspective view of an embodiment of a secondary lock.
Figure 5:
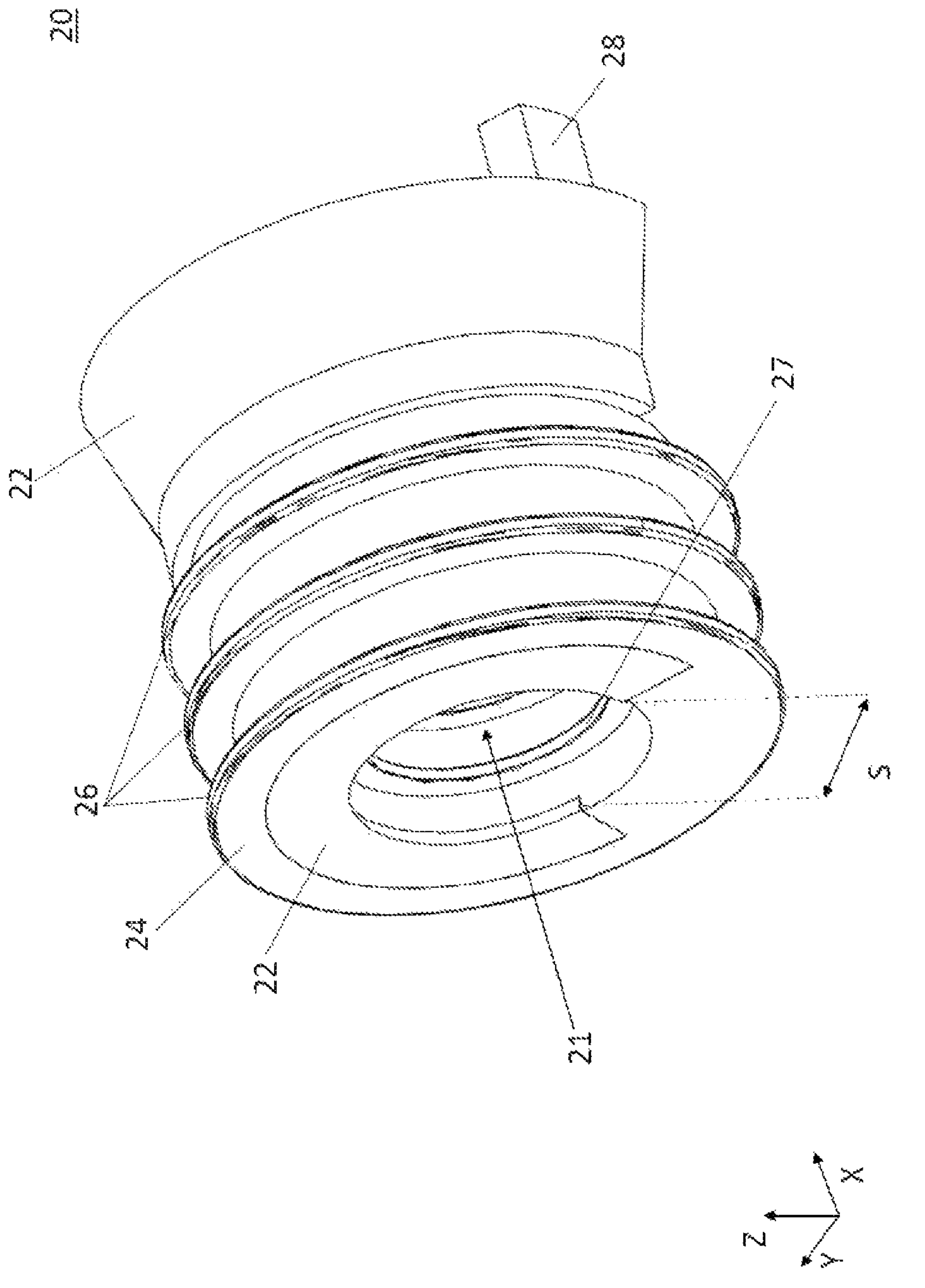
FIG. 5 is another perspective view of the secondary lock from FIG. 4.
Figure 6:
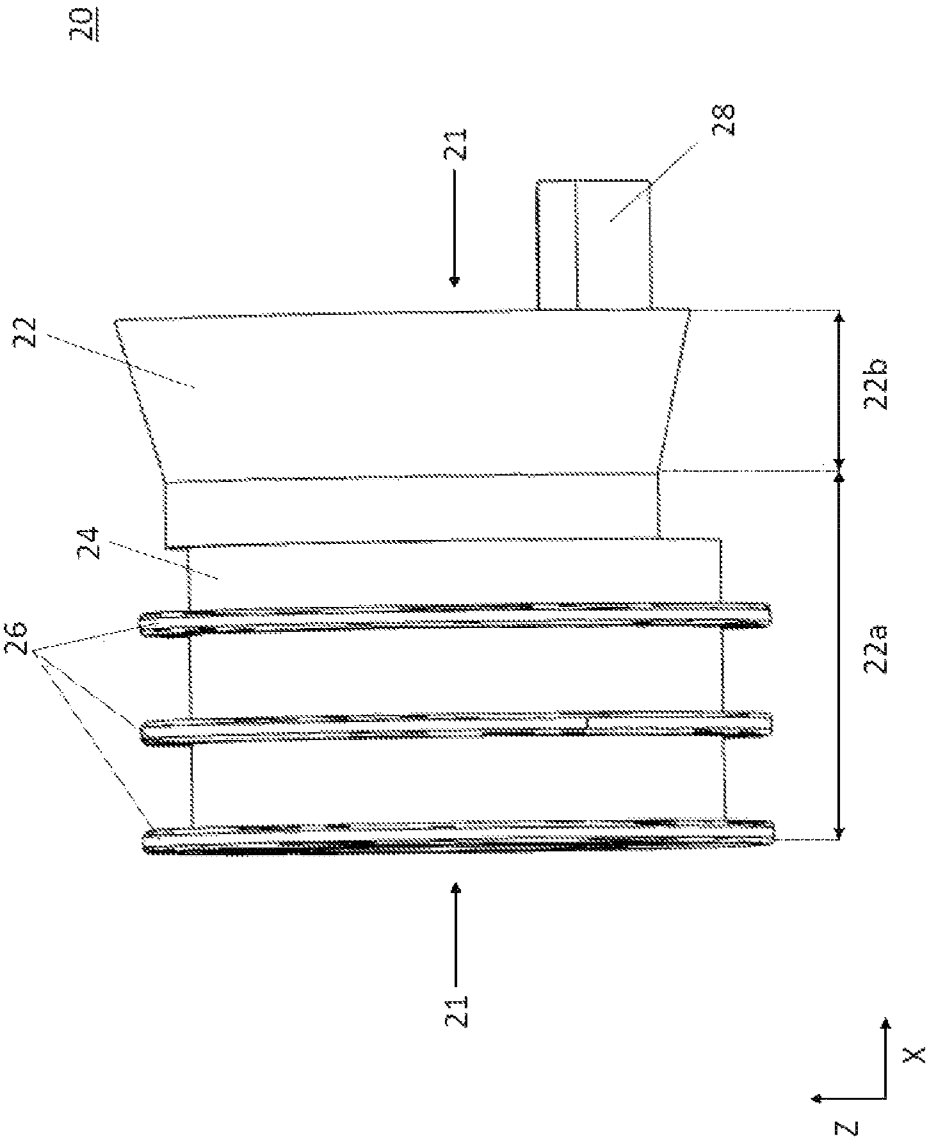
FIG. 6 is a side view of the secondary lock from FIG. 4.

FIG. 4-6 show an embodiment of the secondary lock 20 in detail. The secondary lock 20 comprises a main body 22 having a through-opening 21. The cable 2 can be led through the through-opening 21, or the secondary lock 20 can be pushed onto the cable 2. The main body 22 of the secondary lock 20 is formed in one piece with a seal 24. In this case, 'in one piece' means a non-releasable connection between the main body 22 and the seal 24.

The main body 22 is preferably made of a harder material than the seal 24. The main body 22 thus gives the secondary lock 20 a certain level of stability. For the main body 22 to also have flexibility, in particular in terms of its outer circumference, a slot S is formed along the longitudinal axis X of the main body 22 in the embodiment thereof shown. In alternative embodiments, the slot S may merely comprise a recess such that the main body 22 is bendable and the outer circumference thereof can be elastically changed.

In addition, the main body 22 may have one or more holes in an outer surface 25*b*. The holes 23 preferably extend from the outer surface 25*b* to an inner surface 25*a*. The seal 24 can pass through these holes during production and connect to the main body 22 more effectively. Recesses 29 or grooves in the main body 22 may be used during production to fix the main body 22 in position. Lastly, one or more projections 28 may be arranged on the main body 22. The projections 28 may also comprise recesses or openings. As already described, a secondary lock 20 may be released from the housing 10 by means of the projections.

The seal 24 has at least one external sealing lip 26. In the embodiments shown, the seal 24 has a plurality of, preferably at least three, external sealing lips 26. The at least one external sealing lip 26 protrudes radially outward from the seal 24. Owing to this structure, in the assembled state the seal 24 can bring about watertight sealing between the secondary lock 20 and the housing 10. In particular, the at least one external sealing lip 26 protrudes so far from the seal 24 that it contacts the housing 10 under tension in the assembled state. This ensures reliable sealing.

In addition, the seal 24 shown has at least one internal sealing lip 27. In particular, the seal 24 has a plurality of internal sealing lips 27. The at least one internal sealing lip 27 protrudes radially inward from the seal 24. Owing to this structure, in the assembled state watertight sealing between the secondary lock 20 and the cable 2 is obtained. In this case, the at least one internal sealing lip 27 may, in the assembled state, abut the cable 2 under tension, like the at least one external sealing lip 26.

To make the slot S in the main body 22 watertight, it is filled by the seal 24 in its longitudinal direction X. In addition, the at least one external sealing lip 26 and/or the at least one internal sealing lip 27 is formed around the full circumference, i.e., also over the slot S. In the embodiment shown, the seal 24 comprises a soft resilient material. The main body 22, and the secondary lock 20 overall, can thus be elastically compressed even when the seal 24 is filling the slot S. By means of this construction, the secondary lock 20 can seal the housing 10 in a watertight manner in the assembled state. In this case, the sealing relates in particular to the opening 12 in the housing 10.

In a preferred embodiment, when fitting the plug connector 1, a secondary lock 20 is first arranged on the cable 2, i.e., is pushed onto the cable 2. Next, the insert of the cable 2 is inserted into the housing 10 through the opening 12. Then, the secondary lock 20 is slid along the cable 2 toward the housing 10. In particular in the region of the opening 12, the housing 10 has a smaller diameter than a second part 22*b* of the secondary lock 20. When the secondary lock 20 is inserted into the housing 10, the secondary lock 20 is in particular radially compressed in the second portion 22*b*. The insertion continues until the entire secondary lock 20 is arranged in the housing 10. When the end position is reached, i.e., when the second portion 22*b* is located in the region of the undercut 16, the secondary lock 20 is expanded again radially in the second portion 22*b*. The expansion occurs due to the resilience of the secondary lock. As a result of the expansion, the secondary lock 20 engages in the undercut 16 and interlockingly latches in the housing 10. In the assembled state, a first portion 22*a* of the secondary lock 20 directly abuts a circumferential rib of the insert or of the crimp barrel stop 9, thereby fixing the insert in position. This prevents the insert or cable 2 fastened to the insert from being pulled out of the housing 10. At the same time, a full-circumference sealing surface is produced by means of the secondary lock 20, thereby making the plug connector 1 watertight.

In one embodiment, the secondary lock 20 for the plug connector 1 is produced in a two-component method. In a two-component method, two different plastics materials are combined to form one component. The two-component method described substantially comprises forming the main body 22 of the secondary lock 20 out of a first material and then forming the seal 24 out of a second material on the main body 22 of the secondary lock 20. The two steps can be carried out in one mold by moving the mold into a suitable/required position by turning or by using an index plate. In an alternative method, the finished main body 22 may be removed from a first mold region and placed in a second mold region to form the seal 24.

In the method, in the case of the secondary lock 20, preferably in the step of forming the main body 22, at least one cut-out, in particular a slot S, is made along the longitudinal axis X of the main body 22. In alternative methods, the slot S may be made in the main body later, for example by mechanical methods. In the described embodiment, the main body 22 is made of a hard material, for example a technical plastics material. If the main body 22 were formed as a cylinder, i.e., without any discontinuity or recesses, the main body 22 would not be flexible. The slot S allows the main body 22 to have some flexibility.

In the described method, this flexibility is retained even when the seal 24 is attached. The seal 24 being described is a soft component and preferably comprises silicone. A Shore hardness can be adjusted depending on requirements and area of application. In addition, thermoplastic elastomers (TPE) may be used as a seal material. Owing to the flexible main body 22 and the soft seal 24, the secondary lock 20 can be engaged with a suitable housing 10, as described above.

In the described method, in the step of forming the main body 22 of the secondary lock 20, recesses 29, preferably grooves 29, are formed in the main body 22. The grooves 29 can be made in a simple manner by the shape of the cavities in the mold. The grooves 29 are used so as to fix the main body 22 in position when turning the mold in order to form the seal 24.

Figure 7:
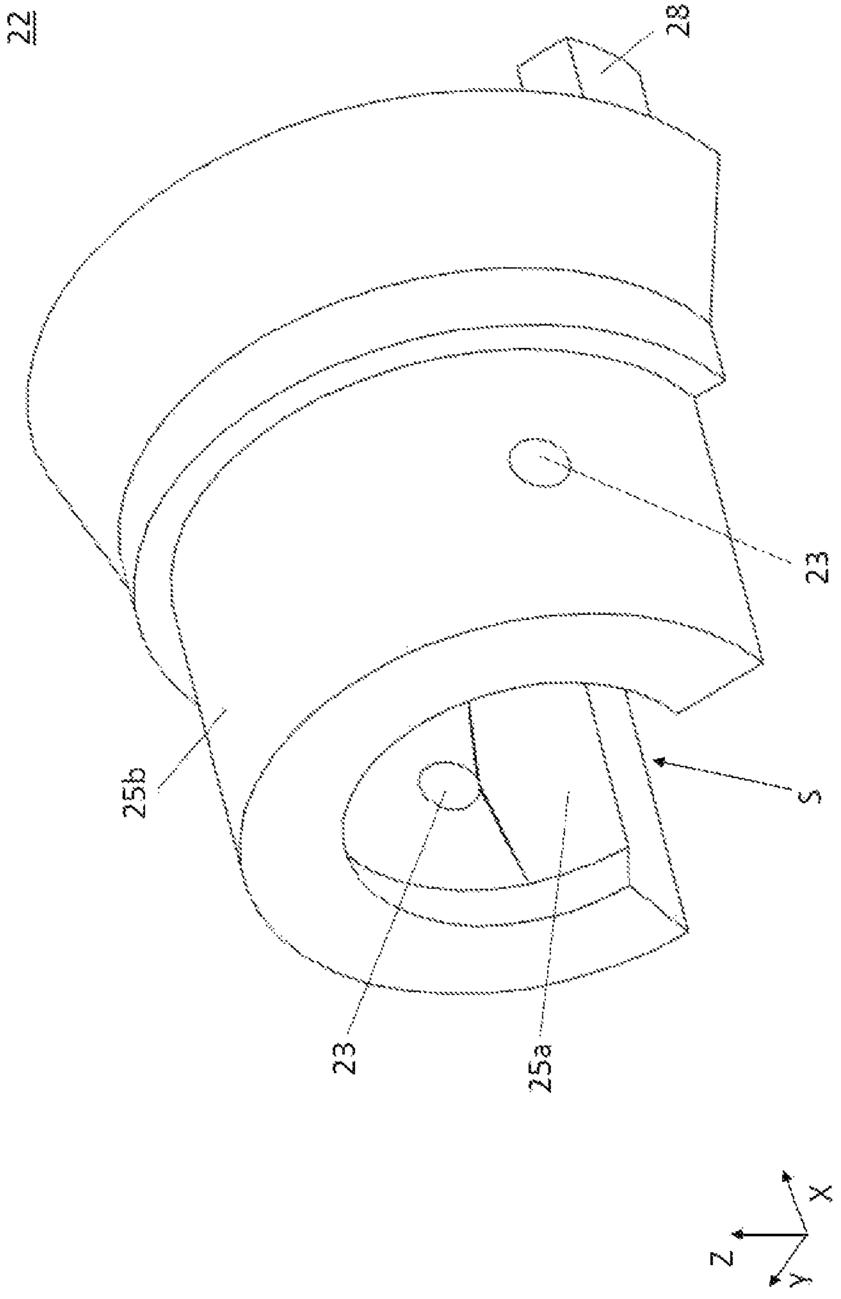
FIG. 7 is a perspective view of an embodiment of the main body of the secondary lock from FIGS. 4-6.

In addition, in the step of forming the main body 22 of the secondary lock 20, holes 23 can be made in the main body 22 (see FIG. 7). The holes 23 preferably connect an outside 25*b* to an inside 25*a* of the main body 22. In the embodiment shown, the holes 23 are arranged in the first portion 22*a* of the main body 22. The reason for this is that the seal 24 is arranged solely in the first portion 22*a*. In the described method, the holes 23 are filled with the second material when forming the seal 24. When forming the seal 24, the holes 23 enable ventilation, and later on the liquid seal material passes through the holes 23 during the filling operation. This prevents unwanted trapped air in the seal 24 and establishes a better connection between the main body 22 and the seal 24.

The above-described production method can be carried out using a device that has at least one mold for producing injection-molded parts having at least one geometric difference. In this case, a first geometry on the mold has an outline for the main body 22 of the secondary lock 20, and a second geometry on the mold has an outline for the main body 22 having the seal 24. The device may comprise an injection molding machine or a system having an injection molding machine.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Plug connector
2 Cable
4 Inner-conductor contact
6 Outer-conductor contact
8 Crimp barrel
9 Crimp barrel stop
10 Housing
12 Opening
14 Cavity
15 Stop face
16 Undercut
18 Contact opening
20 Secondary lock
21 Through-opening
22 Main body
22*a* First portion
22*b* Second portion
23 Holes
24 Seal
25*a* Inside
25*b* Outside
26 External sealing lip
27 Internal sealing lip
28 Projection
29 Recesses
S Slot
X Longitudinal direction
Y Second direction
Z Third direction

What is claimed is:

1. A plug connector for a cable, the plug connector comprising:

a housing having at least one opening and at least one cavity, wherein the cable is insertable into the at least one cavity through the at least one opening;

at least one undercut formed on a circumference of the at least one cavity; and a secondary lock that is releasably engageable with the at least one undercut, wherein the cable is fastenable in the housing by the secondary lock, and wherein the secondary lock comprises a main body which is formed in one piece with a seal such that the housing is sealable by the secondary lock in a watertight manner, wherein the secondary lock includes an engagement portion formed as a hollow truncated cone, wherein a slot extends through the truncated cone and along an entire length of the main body of the secondary lock in a longitudinal direction of the secondary lock, wherein the housing includes, in a region of the at least one opening, a smaller inner diameter than an outer diameter of the engagement portion, and wherein the engagement portion of the secondary lock is configured to radially compress during insertion of the secondary lock into the housing and configured to radially expand in an end position within the housing.

2. The plug connector according to claim 1, wherein:

the seal has at least one external sealing lip that protrudes radially in an outward direction in order to obtain watertight sealing between the secondary lock and the housing; and/or the seal has at least one internal sealing lip that protrudes radially in an inward direction in order to obtain watertight sealing between the secondary lock and the cable.

3. The plug connector according to claim 1, wherein the seal fills the slot of the secondary lock.

4. The plug connector according to claim 1, wherein the main body of the secondary lock is made of a harder material than the seal such that the secondary lock is stable and elastically deformable.

5. A method for producing the secondary lock for the plug connector according to claim 1, the method comprising:

using a two-component method; and forming the main body of the secondary lock out of a first material, and then forming the seal out of a second material on the main body of the secondary lock.

6. The method according to claim 5, wherein the two-component method comprises an injection molding method, and the first material is harder than the second material.

7. The method according to claim 5, wherein, in the step of forming the main body of the secondary lock, at least one cut-out is made along a longitudinal axis of the main body.

8. The method according to claim 7, wherein the at least one cut-out is the slot.

9. The method according to claim 5, wherein, in the step of forming the main body of the secondary lock, recesses are formed in the main body such that the main body is centerable using the recesses when the seal is formed.

10. The method according to claim 9, wherein the recesses are grooves.

11. The method according to claim 5, wherein, in the step of forming the main body of the secondary lock, holes are made in the main body, and the holes are filled with the second material when forming the seal.

12. A device for the method according to claim 5, the device comprising:

a mold configured to produce injection-molded parts having at least one geometric difference, wherein:

a first geometry on the mold has an outline for the main body of the secondary lock; and a second geometry on the mold has an outline for the main body of the secondary lock together with the seal.

13. The plug connector according to claim 1, wherein the engagement portion flares radially outward in the longitudinal direction from a longitudinal center of the main body toward a longitudinal end of the main body.

14. The plug connector according to claim 1, wherein the main body includes projections extending in the longitudinal direction away from the engagement portion, and wherein the projections are configured to radially expand and compress together with the engagement portion.

15. A method for producing a secondary lock for a plug connector for a cable, wherein the plug connector comprises:

a housing having at least one opening and at least one cavity, wherein the cable is insertable into the at least one cavity through the at least one opening, at least one undercut formed on a circumference of the at least one cavity, and a secondary lock that is releasably engageable with the at least one undercut, wherein the cable is fastenable in the housing by the secondary lock, and wherein the secondary lock comprises a main body which is formed in one piece with a seal such that the housing is sealable by the secondary lock in a watertight manner, the method comprising:

using a two-component method; and forming the main body of the secondary lock out of a first material, forming holes in the main body, and then forming the seal out of a second material on the main body of the secondary lock such that the holes are filled with the second material.

* * * * *